May 17, 1966 J. J. DRAUTMAN 3,252,018
SUPERCONDUCTING ALTERNATOR
Filed Dec. 3, 1963

INVENTOR.
JAMES J. DRAUTMAN
BY
ATTORNEY

United States Patent Office 3,252,018
Patented May 17, 1966

3,252,018
SUPERCONDUCTING ALTERNATOR
James J. Drautman, Jamison, Pa., assignor to Malaker Laboratories, Inc., High Bridge, N.J., a corporation of New Jersey
Filed Dec. 3, 1963, Ser. No. 327,613
4 Claims. (Cl. 310—16)

This invention deals with an alternatir operating under superconducting conditions. More specifically, it relates to a superconducting alternator, particularly of the miniature type, and designed to utilize the principle of flux compression in multiply-connected superconductors.

When a multiply-connected superconductor, such as a cylindrical shell made of superconducting material, is cooled below its transition temperature in the presence of a magnetic field, the flux enclosed by the superconductor is trapped, and it remains constant, even though the external field may be reduced to zero. If a superconductor is cooled below its critical temperature in a zero magnetic field, the field cannot penetrate beyond a small depth known as the penetration depth.

According to this invention, it has been found possible to trap a magnetic flux within a multiply-connected superconductor, and then to insert a superconducting piston, which has been cooled to below its critical temperature in a zero magnetic field. Since the flux can neither penetrate this piston, nor escape from the core, the cross-sectional area available for the flux is reduced, so that the magnetic field must rise correspondingly. By employing an armature wound around the interior of the cylinder, and a solenoid coil wound around the exterior, hight flux densities can be obtainable. Reciprocation of the piston thus produces an alternating current generator having a reasonably high output. In order to trap the flux in the generator after the superconducting materials have been cooled below their transition temperatures, a switch, made of heater wire wound around a core, is utilized. Since in normal operation the alternator is cooled below its transition temperature before the magnetic field is applied, the switch is utilized to permit flux to intially penetrate the cylinder by drawing a portion of the cylinder conventionally.

Figure 1:
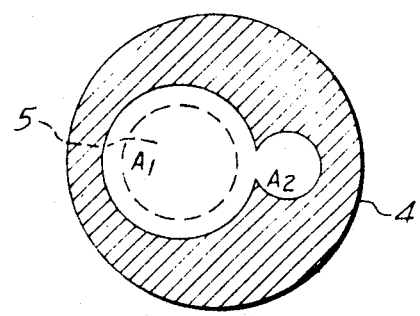
Figure 2:
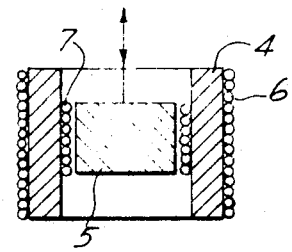
Figure 3:
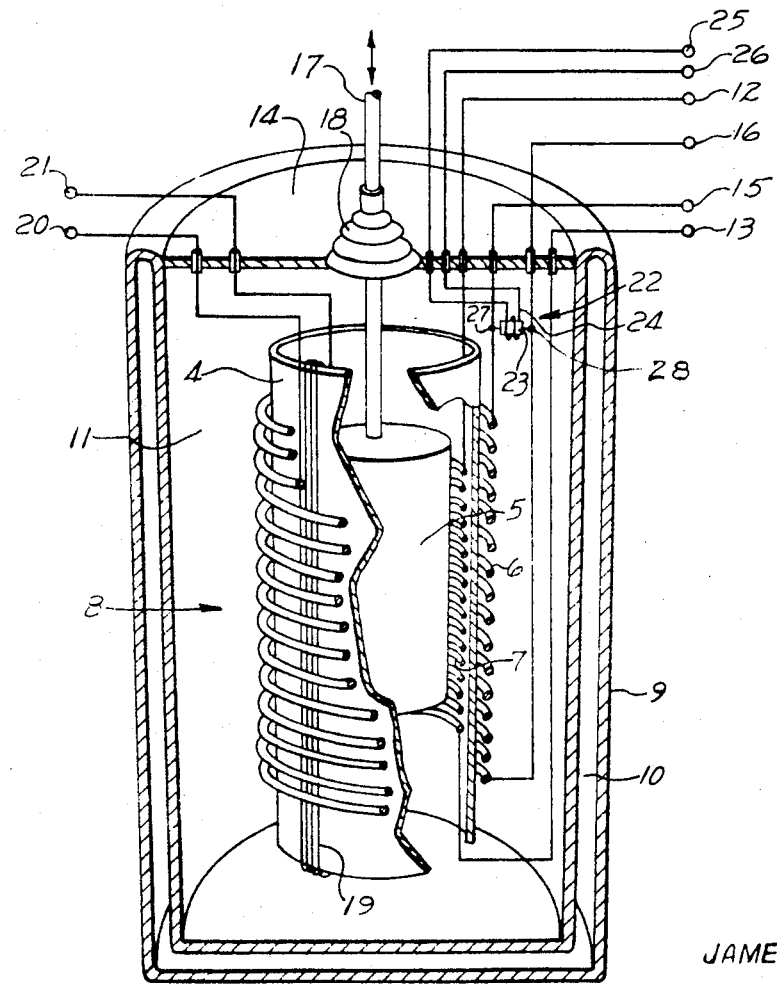

The invention will be more readily understood by reference to the accompanying drawings in which a preferred embodiment is described, and in which FIGURE 1 depicts a cross-sectional view of a multiply-connected superconductor, while FIGURE 2 illustrates a cross-sectional side view of a multiply-connected superconductor provided with armature and solenoid and a reciprocating superconducting piston. FIGURE 3 presents a cross-sectional side view of a superconducting alternator of the present invention. Similar numerals refer to similar parts in the various figures.

Referring again to the drawings, and particularly to FIGS. 1 and 2, in the case of a multiply-connected superconductor 4, made of a superconducting material, such as Nb+25% Zr, having flux openings $A_1$ and $A_2$, the superconductor being cooled to below its critical temperature of about 4° K., it will be noted that, if a field $B_0$ is trapped in the superconductor 4, the flux therein would be:

$$\phi = B_0(A_1 + A_2)$$

Now, if a superconducting piston 5 were inserted in opening $A_1$, then $$\phi' = B'[A_2 + (A_1 - A_p)]$$

Where $\phi'$ represents the compressed flux, B' is the compressed field, and $A_p$ is the area taken up by the piston 4. Since the total flux cannot change, $\phi' = \phi$, and $$\frac{B'}{B_0} = \frac{(A_1 + A_2)}{A_2 + (A_1 - A_p)}$$

This latter relationship is valid as long as B' is not greater than the critical field for the superconducting material used, at the temperature of operation. Materials have been developed recently which are capable of remaining superconducting in fields of 200,000 oersteds.

An electrical generator of the present invention utilizes the aforesaid principle of flux compression. As shown simply in FIG. 2, it employs a multiply-connected superconductor 4 having an externally-wound solenoid coil 6, wound in insulating relation around conductor 4, and an armature 7, similarly wound along the inner wall of conductor 4. Piston 5, also made of superconducting material, is reciprocated within said armature. It is to be understood that coils 6 and 7, for the purposes of the present invention, may be made of conventional material or of superconducting material. The latter, of course, is preferred, due to the fact that the unit may be made of small size, yet high magnetic fields may be employed so as to produce relatively high outputs.

As is apparent from FIG. 3, the alternator, indicated generally by numeral 8, is enclosed in a Dewar flask 9, having vacuum space 10 between its walls. The flask 9 is filled with a cryogenic liquid, such as helium 11. The generator 8 consists of superconducting solenoid 6 designed to produce the intial field $B_0$. The core of the solenoid is a superconducting hollow cylinder 4 having a wall thickness greater than $0.127 \times 10^{-3}$ inches, which is the penetration depth for a magnetic field in the material used (in this case Nb+25% Zr). An armature 7, also preferably of superconducting material, is wound around the interior wall of cylinder 4, and its leads 12 and 13 serve to remove the output power of the alternator 8. It will be noted that flask 9 is provided with permeable cover 14 through which the various leads are drawn, in insulating relation therewith. Power for the solenoid coil 6 is fed in through leads 15 and 16. Superconducting piston 5 reciprocates within armature winding 7, and it is provided with rod 17 which passes through flask cover 14 via a flexible bellows connection 18. Piston rod 17 is reciprocated by an external source (not shown).

By using the superconducting solenoid, high flux densities can be obtained with minimum size and weight of components. Since it is desirable, if not necessary, to charge the generator with coolant prior to use provision must be made to trap the flux in the generator after the superconducting materials have been cooled to below their transition (critical) temperatures. According to this invention, a novel switch is employed, consisting of a few turns of heater wire (e.g., resistance wire soid as "Nichrome") wound lengthwise the core, such as wire 19 wound in insulating relation lengthwise of core 4, around the cylindrical wall thereof, the terminal ends 20 and 21 of the wire being connected to a source of current for heating the wire when flux trap control is necessary. When this heater 19 is energized, a cross section of core 4 then is no longer superconducting or multiply-connected, and can be considered as being driven as normal, so that the flux then can penetrate the core. When the heat is turned off from "switch" 19, the flux becomes trapped within the core.

When in operation, the flask 9 is cooled with cryogenic liquid, such liquid helium, the temperature of which is below the transition temperature of the superconducting materials used. Solenoid coil 6 then is energized by passing direct current through 15 and 16, whereby core 4 becomes magnetized. A superconducting "switch," indicated generally as 22, is utilized so that, once solenoid coil 6 has been energized, the magnet 4 becomes a part of a superconducting loop, and the external power source at leads 15 and 16 can be disconnected. "Switch" 22 consists of a superconducting wire 23 wound with a few turns of heater wire 24 which are energized via leads 25 and 26. The ends of cylinder 23 are connected across leads 15 and 16 at points 27 and 28 in the cryogenic liquid. It is to be understood that heater wire 24 need be only adequate to heat a portion of wire 23 to above its critical temperature, where it is no longer superconducting, when such "switching" is required. Thereafter, the flux trapping switch 19 is energized so that flux can penetrate generator core 4. This "switch" then is turned off, trapping the flux.

When piston 5 (also made of superconducting material) is reciprocated up and down within core 4, an alternating current is generated in armature 7, and this current may be drawn off through leads 12 and 13. Actually, the magnetic field expels piston 5 from core 4, so that energy is needed only to pull the piston back into the center.

The voltage induced in armature 7 may be indicated by the following relationship:

$$V = -d\phi/dt$$

Where V is the voltage, $\phi$ the flux, and $t$ is time. By neglecting end effects, and assuming the field to vary linearly with time, we obtain the following relationship:

$$V = -nA\frac{(B_1 - B_0)}{\Delta t} \times 10^{-8}$$

Where $n$ is the number of turns of solenoid 6, A is the cross-sectional area, in cm.$^3$ of magnet 4, $B_1$ is the compressed field, in gauss, after piston 5 has entered the magnet, $B_0$ is the original field when piston 5 is removed, in gauss, and $t$ is the time, in seconds, for one cycle.

Using a 5 cm. long magnet with a 2 cm. I.D., and a 1.8 cm. diameter piston, $$\frac{B_1}{B_0} = 2.76$$

So that, from an initial field of 1 kg., $B_1$ is 2.76 kg. With a 1000 turn armature, and an operating frequency of 60 cycles, $$V = 3.3 \text{ volts}$$

The losses, as estimated from the data on wires made of Nb+25% Zr, are as follows:

$$P/m = 2 \times 10^{-24}(H^2\sqrt{f})^3 \text{ watts per gm. of superconductor}$$

For a field of 3 kg., and 60 c.p.s., the loss would be:

$$P/m = 2.6 \times 10^{-11} \text{ watts/gm.}$$

From the foregoing, it is seen that a useful and novel low power electrical generator has been devised, utilizing the principle of flux compression is multiply-connected superconductors. Use of such a generator permits extreme miniaturization, while at the same time significant power outputs may be obtained.

I claim:
1. A superconducting electrical generator, comprising,
   a hollow cylindrical shell made of superconducting material and designed to become a superconductor when cooled to below its transition temperature,
   a conductive coil wound around the outside of said shell, thereby forming a solenoid,
   a conductive coil wound around the inside of said shell and serving as an armature, and having output leads at its ends, and
   a piston made of superconducting material and designed to be reciprocated within said armature coil, and designed, when reciprocated, while said generator is under superconducting conditions, to induce an alternating current in said armature coil, which current may be drawn out through said armature coil leads.

2. A superconducting electrical generator, according to claim 1, in which a heater wire is wound around said shell, serving as a flux trap switch when energized to heat a portion of said shell to above its transition temperature.

3. A superconducting electrical generator, according to claim 1, in which a length of superconducting material is connected, in short-circuiting relation, across the solenoid coil leads subjected to superconducting conditions, and a heater wire wound around said length, serving as a flux switch when energized to heat said length to above its transition temperature.

4. A superconducting electrical generator, comprising,
   an insulated vessel designed to contain a cryogenic coolant capable of refrigerating to below the superconducting transition temperature of the superconducting generator,
   a hollow cylindrical shell made of superconducting material and disposable in said vessel,
   a coil made of superconducting material and wound around the outside of said shell, thereby forming a solenoid,
   a coil made of superconducting material and wound around the inside of said shell, and serving as an armature and having output leads at its ends,
   a piston made of superconducting material and designed to be reciprocated within said armature coil, and designed when reciprocated, while said generator is under superconducting conditions, to induce an alternating current in said armature coil, which current may be drawn out through said armature coil leads,
   a heater wire wound around said shell and serving as a flux trap switch when energized to heat a portion of said shell to above its transition temperature,
   a length of superconducting material connected in short-circuiting relation across said solenoid coil leads subjected to superconducting conditions, and
   a heater wire wound around said length and serving as a flux switch when energized to heat said length to above its transition temperature.

No references cited.

ORIS L. RADER, *Primary Examiner.*

D. F. DUGGAN, *Assistant Examiner.*